R. M. Hoe.
Operating Fly Frames.
N°. 18640. Patented Nov. 17, 1857.

R. M. Hoe.
Operating Fly Frames.
Nº 18640.   Patented Nov. 17, 1857.

UNITED STATES PATENT OFFICE.

RICHD. M. HOE, OF NEW YORK, N. Y.

MODE OF OPERATING FLY-FRAMES OF PRINTING-PRESSES.

Specification of Letters Patent No. 18,640, dated November 17, 1857.

*To all whom it may concern:*

Be it known that I, RICHARD M. HOE, of the city, county, and State of New York, have invented a new and useful Improvement in Operating the Fly-Frames of Printing-Presses; and I do hereby declare that the following is a full, clear, and exact description of the same, reference being had to the annexed drawings, making a part of this specification, in which—

Figure 2:
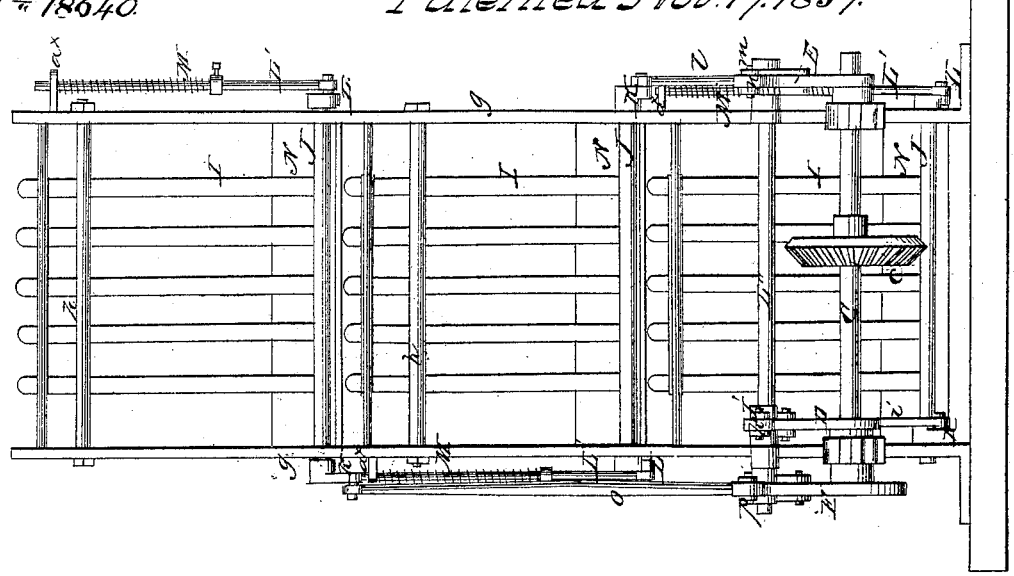
Figure 1:
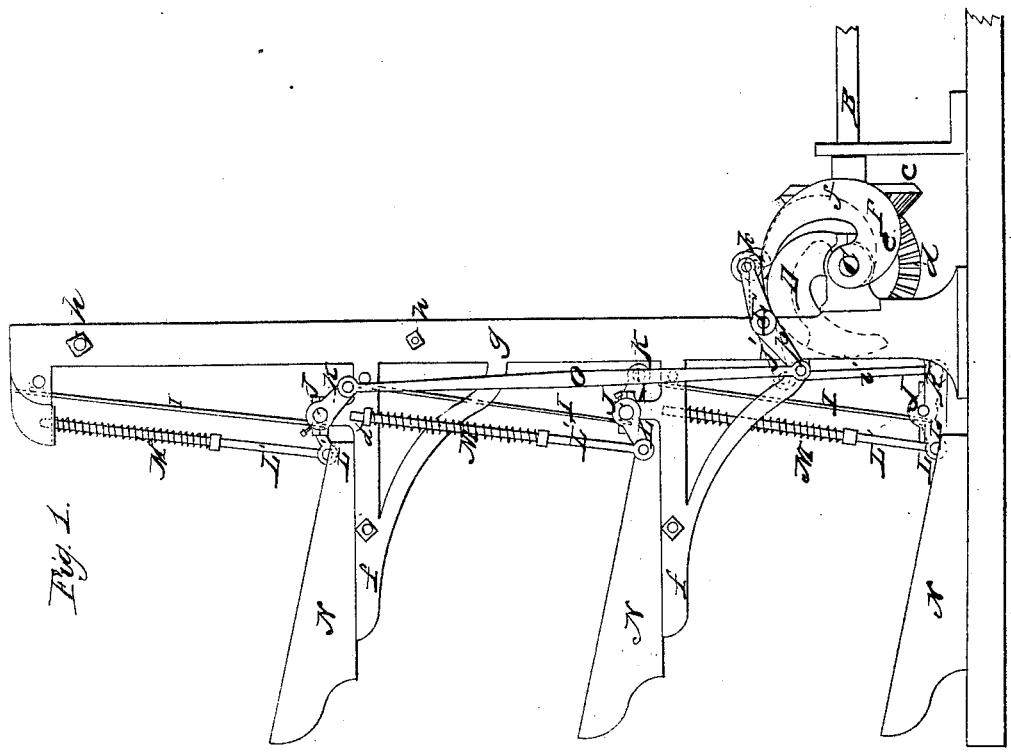
Figure 3:
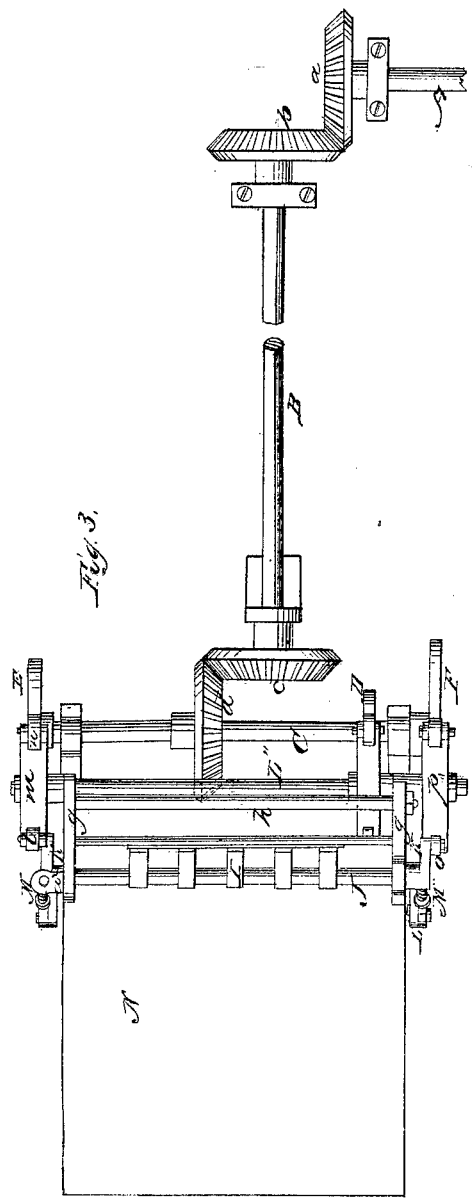

Figure 1 is a side elevation of my improvement. Fig. 2, is an end elevation of the device. Fig. 3, is a plan or top view of the same.

Similar letters of reference indicate corresponding parts in the three figures.

This invention relates to an improvement in the manner of operating the fly frames of printing presses, and is mainly applicable to the frames used on my type-revolving printing machines. As now constructed, the fly frames are operated by cams placed on a shaft under the center of the press or machine, at the greatest possible distance from the fly-frames which are placed at each end of it; the frames being operated from the cams through the intervention of levers, connecting rods, bell cranks, &c., the whole forming quite a complex arrangement and an objectionable one in consequence of the wear causing play or looseness in the parts severally, the whole effect of the inaccuracy evincing itself in the operation of the fly frames. Moreover the connecting rods and other parts cited are of great inconvenience to the pressman in getting in and out of the pit underneath the press to attend to the regulation of the fly cams, inking apparatus, &c.

The improvement consists in obviating the objections above alluded to, by having a cam shaft placed at each end of the machine, so that the fly frames will be operated upon in a very direct and simple manner, as hereinafter shown.

To enable those skilled in the art to fully understand and construct my invention, I will proceed to describe it.

A, Fig. 3, is a shaft placed transversely under the center of the machine, and giving motion to a longitudinal shaft B by means of the gearing ($a$) ($b$), the outer end of the shaft B communicating motion to a transverse shaft C, by means of similar gearing ($c$) ($d$). On the shaft C, three cams D, E, F, are placed. The form of the three cams is plainly shown in Fig. 1 each being composed of an eccentric portion ($e$) and concentric portion ($f$).

I represents the fly frames, which are constructed in the usual manner, and are attached each to a shaft J; and to one end of each shaft J, an arm K is attached; the opposite ends of the shafts, having arms L attached, which arms are connected to rods $L^1$, which work in guides ($a^x$) and have spiral springs M on them.

N represents the fly boards upon which the springs M have a tendency to keep the fly frames. The fly boards are secured to brackets ($f$) which are attached to uprights ($g$) ($g$) connected by cross-ties ($h$).

The arm K, of the lower fly frame I, is connected by a rod ($i$) with one end of an arm ($j$) which is placed on a shaft $L''$; the said shaft being fitted in suitable bearings in the lower part of the uprights ($g$) ($g$). The opposite end of the arm ($j$) is provided with a friction roller ($k$) which bears against the cam D on the shaft C. The arm K, of the middle or central fly frame I, is connected by a rod ($l$) with one end of an arm ($m$), also placed on the shaft $L''$, the opposite end of said arm being provided with a friction roller ($n$) which bears against the cam E, as seen in Figs. 2 and 3. The arm K, of the uppermost fly-frame I, is connected by a rod ($o$) with an arm ($p$) on the shaft $L''$, which arm is precisely like the arms ($j$) ($m$) previously described and which has its roller bearing against the cam F, on the shaft C. The cams D, E, F, act similar to wipers or tappets; the eccentric portions ($e$) raising the fly frames, and the concentric portions ($f$) retaining them in an elevated position while the sheets are passing down before them; and when the concentric portions have passed the friction rollers of their several arms, the fly-frames are thrown down upon the fly-boards by the action of the springs M, and the sheets thereby deposited upon the fly-boards.

The three fly frames represented and described are placed at one end of my "six-cylinder rotary press," and they serve three cylinders thereof at one end of the machine, the other three cylinders having three frames similarly arranged and operated at the opposite end of the machine; the shaft B being extended the whole length of the machine, or two shafts B being connected with the shaft A. Hitherto the cams have been placed on the shaft A; and hence a comparatively complex arrangement was necessary in order to actuate the frames therefrom, owing to the great distance of the cams from the frames.

Having thus described my invention, what I claim as new and desire to secure by Letters-Patent, is:—

Operating the fly frames I, by means of cam-shafts C, placed one at each end of the machine, and provided with cams D, E, F, and used in connection with arms (*j*) (*m*) (*p*), rods (*i*) (*l*) (*o*) arms K, and springs M, or an equivalent device, whereby the cams are made to actuate the fly-frames in a more direct manner, and consequently insuring a more perfect operation of the same, than heretofore.

RICHD. M. HOE.

Witnesses:
T. J. SHEPHERD,
O. D. MUNN.